United States Patent [19]
Sharma

[11] Patent Number: 6,055,606
[45] Date of Patent: Apr. 25, 2000

[54] WRITEBACK CACHE CELL WITH A DUAL PORTED DIRTY BIT CELL AND METHOD FOR OPERATING SUCH A CACHE CELL

[75] Inventor: Vinod Sharma, San Jose, Calif.

[73] Assignee: SandCraft, Inc., Santa Clara, Calif.

[21] Appl. No.: 08/924,604

[22] Filed: Sep. 5, 1997

[51] Int. Cl.[7] .................................................. G06F 12/00
[52] U.S. Cl. .......................... 711/131; 711/143; 711/156; 365/230.05
[58] Field of Search ..................................... 711/131, 142, 711/156, 143; 365/230.05, 49

[56] References Cited

U.S. PATENT DOCUMENTS

| 5,781,924 | 7/1998 | Zaitzeva et al. . |
| 5,860,158 | 1/1999 | Pai et al. . |
| 5,900,016 | 5/1999 | Ghosh . |

Primary Examiner—Jack A. Lane
Attorney, Agent, or Firm—Blakely, Sokoloff, Taylor & Zafman

[57] ABSTRACT

A writeback cache cell and method for operating a writeback cache. In one example, the method includes reading a memory cell of the writeback cache through a first port to determine whether the memory cell stores a first value which indicates that a memory location in the writeback cache has updated data relative to data stored in another memory and writing the first value to the memory cell through a second port if the reading step determined that the memory cell did not store the first value. An example of a writeback cache cell includes a memory cell storing a first value which indicates that a memory location in the writeback cache has updated data relative to data stored in another memory location when the data stored in the another memory location is invalid and includes a first port coupled to the memory cell and a second port coupled to the memory cell. The first port is used to read the memory cell to determine if the memory cell is storing the first value, and the second port is used to write the first value to the memory cell.

18 Claims, 6 Drawing Sheets

WRITEBACK CACHE CELL WITH A DUAL PORTED DIRTY BIT CELL AND METHOD FOR OPERATING SUCH A CACHE CELL

BACKGROUND OF THE INVENTION

The field of the present invention relates generally to digital processing systems which have cache memories and more particularly to digital processing systems and cache memories which employ writeback cache techniques.

Digital processing systems often employ a cache memory which is designed to operate faster than another memory device which may be referred to as "main memory". FIG. 1 shows a generalized example of a digital processing system which includes a processor, embodied in the form of a microprocessor 11, and a bus 12 along with cache memory 14 and the main memory 16. The microprocessor 11, the cache 14, and the DRAM 16 are all coupled to the bus 12 in order to communicate information back and forth between the various components of this system. Also coupled to the bus 12 is an I/O controller 18 which, as shown in FIG. 1, supports two input/output devices 20 and 22. The example shown in FIG. 1 may be a general purpose computer system or a dedicated processing system in, for example, a printer or a video game system. The microprocessor 11 obtains information from memory and performs arithmetic and logical operations on the fetched information and writes back results into memory. It has been observed that the microprocessor often operates on only a very small subset of the information resident in memory over a period of time. The cache 14, which is sometimes referred to as a level 2 cache and the cache 24, which is sometimes referred to as a level 1 cache, may be used to store a small subset of the information resident in the DRAM 16 in order to speed up the operation of the system. It will be appreciated that the level 1 cache is typically located on the same single semiconductor substrate which includes the microprocessor 11. It will also be appreciated that the level 1 cache may be a separate integrated circuit housed within the same packaging which houses the integrated circuit that forms the microprocessor 11.

FIG. 2 shows a typical example of a cache memory. The cache memory includes two arrays, one for data and the other for tag addresses. The data array of the cache holds a copy of a portion of information (referred to as a line of information) of the main memory, such as the memory DRAM 16 shown in FIG. 1. The tag information stored in the tag array 34 determines or specifies the memory location associated with the data from the main memory. Typically, each cache line in the tag array 34 is associated with a corresponding cache line in the data array 32. As an example, FIG. 2 shows two cache lines 41a and 42a in the tag array 34 which correspond to cache lines 41b and 42b respectively of the data cache array 32. Each cache line includes a plurality of memory cells along a row. Each memory cell along a row may be considered to form a column with corresponding memory cells in the same column in other rows of the array. Thus, for example, the column 44 of the tag array 34 contains a plurality of dirty bit memory cells for storing dirty bits which will be discussed below.

When information is to be written into the memory (e.g. written from the microprocessor 11 through the bus 12 into the SRAM cache 14 and the DRAM 16) it can be either written directly into the main memory as well as the caches or only into the caches. When the data is written only into the caches, the caches hold the latest (updated) piece of information. The caches that support this mechanism of writing data are called writeback caches. The advantage of writeback caches is that the data traffic is limited only between the processor and the caches, leaving the main memory free for other operations (e.g. a DMA operation). The main memory, such as the DRAM 16, has old or stale information which has to be updated when the processor needs to use the cache line holding the updated copy of the data for other purposes. Each cache line has a special indicator to determine whether the information resident in these lines is the updated version of the information resident in the main memory. This special indicator is referred to as a "dirty bit" and if a cache line has the latest copy of a piece of information then this indicator, stored in the dirty bit memory cell of that cache line, will indicate that the cache line contains the latest copy of the information. As shown in FIG. 2, cache line 41a which corresponds to cache line 41b in the data cache array contains a memory cell 39 which is used to store a dirty bit which specifies the status of the information in the cache line relative to the corresponding information in main memory.

FIG. 3 shows an example of a prior art memory cell 39 which is used to store the dirty bit for a particular cache line. The memory cell 39 includes two data line electrodes 51 and 52 which are referred to as bit and bit bar respectively. A word line 53 controls the writing and reading from the memory cell 39 which is formed by the cross coupled inverters 56 and 57 which form a bistable static memory cell as is known in the art. Pass transistors 54 and 55 couple respective outputs from the inverters 56 and 57 to the data lines 51 and 52.

If the processor, such as the microprocessor 11 of FIG. 1 needs to write to three different cache lines in the cache memory, such as cache 14, in a writeback cache manner, then the microprocessor 11 must perform six operations, two for each cache line. In particular, the microprocessor must determine if the dirty bit is to be set by reading the dirty bit in the particular cache line and if the bit is not set indicating that the line is not dirty then it must set the dirty bit of the particular cache line. It is assumed that the writing operations will be setting the dirty bits of the respective cache lines because new data or updated data is being stored in each cache line. An alternative approach in the prior art which seeks to reduce the number of steps required to perform this operation involves accessing each cache line to determine if the dirty bit is to be set and storing the result (which shows the state of the cache line's dirty bit) in a buffer. The processor must then look for empty cycles where the processor is not using the cache and then it must update the dirty bit in each cache line where the buffer indicates that the dirty bit for the cache line is to be set to indicate that the cache line is dirty. This approach requires extra pathways and requires managing the buffer to avoid overflow situations and otherwise maintaining the buffer. Yet another approach to accomplish setting the dirty bit is to associate the dirty bit with the data in data array (e.g. array 32 in FIG. 2) rather than the tag array (e.g. array 34 of FIG. 2). The dirty bit is updated when the data is written into the cache, freeing up the tag for a subsequent access. A major disadvantage of this scheme is that the data of the entire cache line should be accessible in one cycle. In most modern microprocessors, the line sizes are large, so that the scheme is practically unimplementable.

It is desirable to provide a simple and elegant solution to the problem of setting the dirty bit as discussed above while at the same time providing improved performance.

SUMMARY OF THE INVENTION

The present invention provides examples of writeback cache cells and methods for operating writeback cache cells which utilize two ports. An exemplary method of the invention includes reading a memory cell in the writeback cache through a first port to determine whether the memory cell stores a first value which indicates that a memory location in the writeback cache has updated data relative to data stored in another memory and also includes writing the first value to the memory cell through a second port if the reading step determined that the memory cell did not store the first value.

An exemplary apparatus of the present invention includes a memory cell storing a first value which indicates that a memory location in the writeback cache has updated data relative to data stored in another memory when the data stored in the another memory is invalid, and also includes a first port coupled to the memory cell and a second port coupled to the memory cell. The first port is used to read the memory cell to determine if the memory cell is storing the first value, and the second port is used to write the first value to the memory cell if, for example, the memory cell was not storing the first value when it was read through the first port.

According to one aspect of one embodiment of the present invention, the first port includes a first word line electrode, and the second port includes a second word line electrode. Typically in this one aspect of the invention, the second word line electrode is not bussed throughout the entire data cache array.

According to another aspect of one embodiment of the present invention, the reading through the first port occurs during a first phase of a clock signal and the writing step through the second port occurs during a second phase of the clock signal, where the first phase and the second phase form one clock cycle of the clock signal.

Other aspects and features of the present invention will become apparent from the following description.

DETAILED DESCRIPTION

The following description sets forth numerous specific details in order to provide a thorough understanding of the present invention. However, after reviewing the specification, it will be understood by those skilled in the art that the present invention may be practiced without these specific details. For example, various signals, layout patterns, memory cell configurations and circuits, and logic circuits may be modified according to the teachings of the present invention. The following description provides examples, and the accompanying drawings show various examples for the purposes of illustration; however, these examples should not be construed in a limiting sense as they are merely intended to provide examples of the present invention rather than to provide an exhaustive list of all possible implementations of the present invention.

Figure 1:
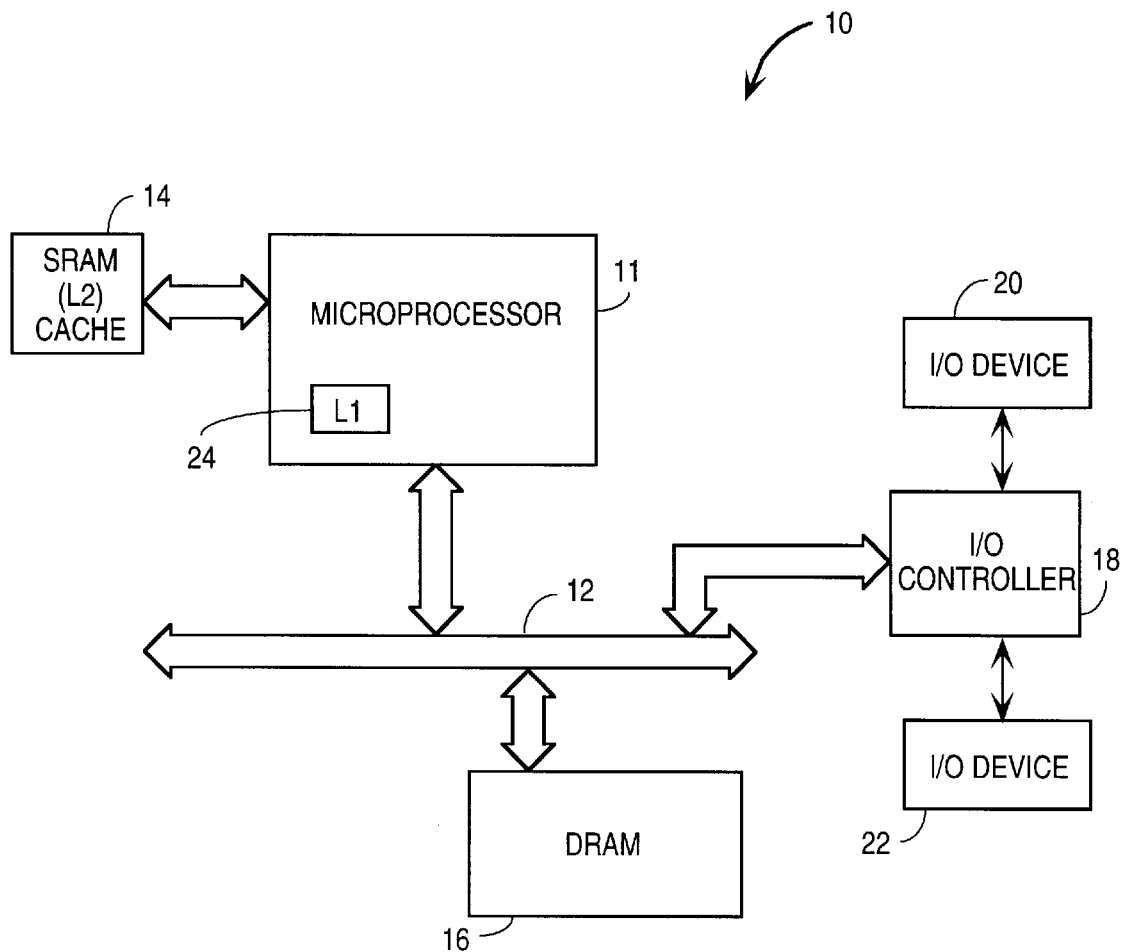
FIG. 1 shows a simplified example of a digital processing system which includes a processor and cache memory and "main" memory.
Figure 2:
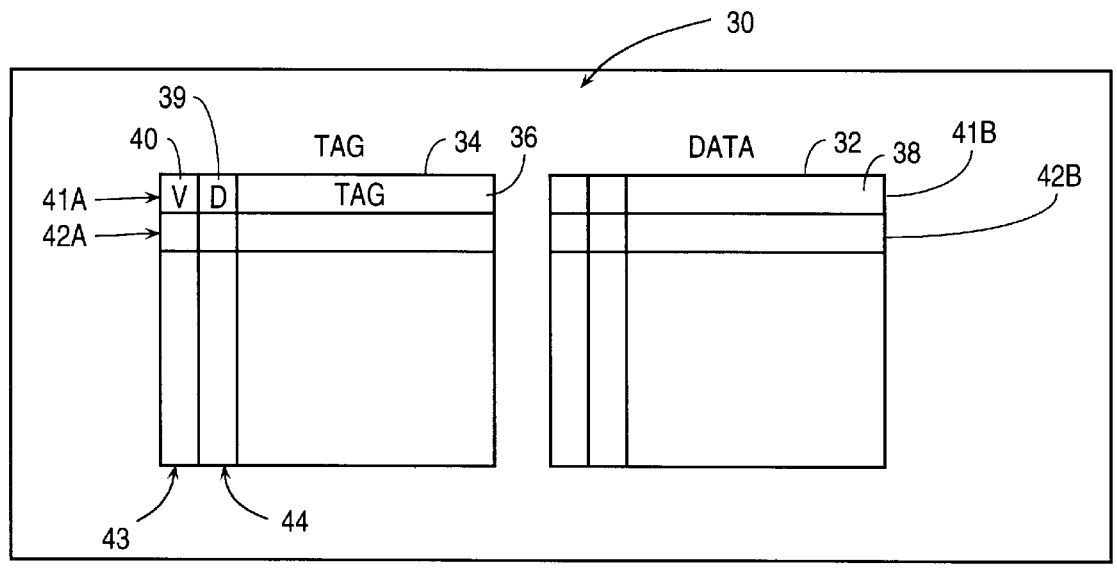
FIG. 2 shows an example of a cache memory which is known in the prior art.
Figure 3:
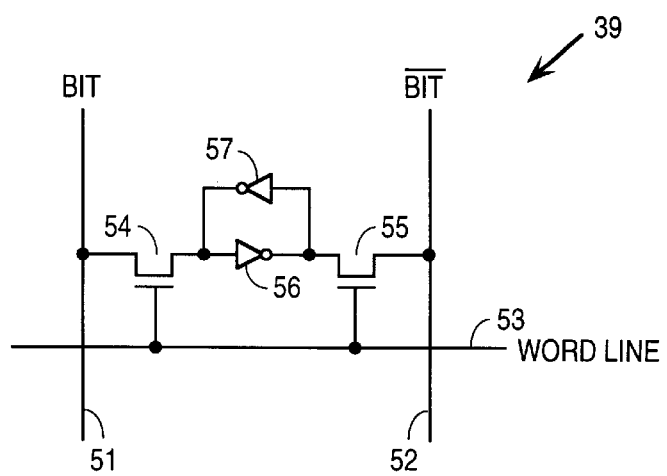
FIG. 3 shows an example of a prior art memory cell in the dirty bit column of the tag array of a conventional writeback cache.
Figure 4A:
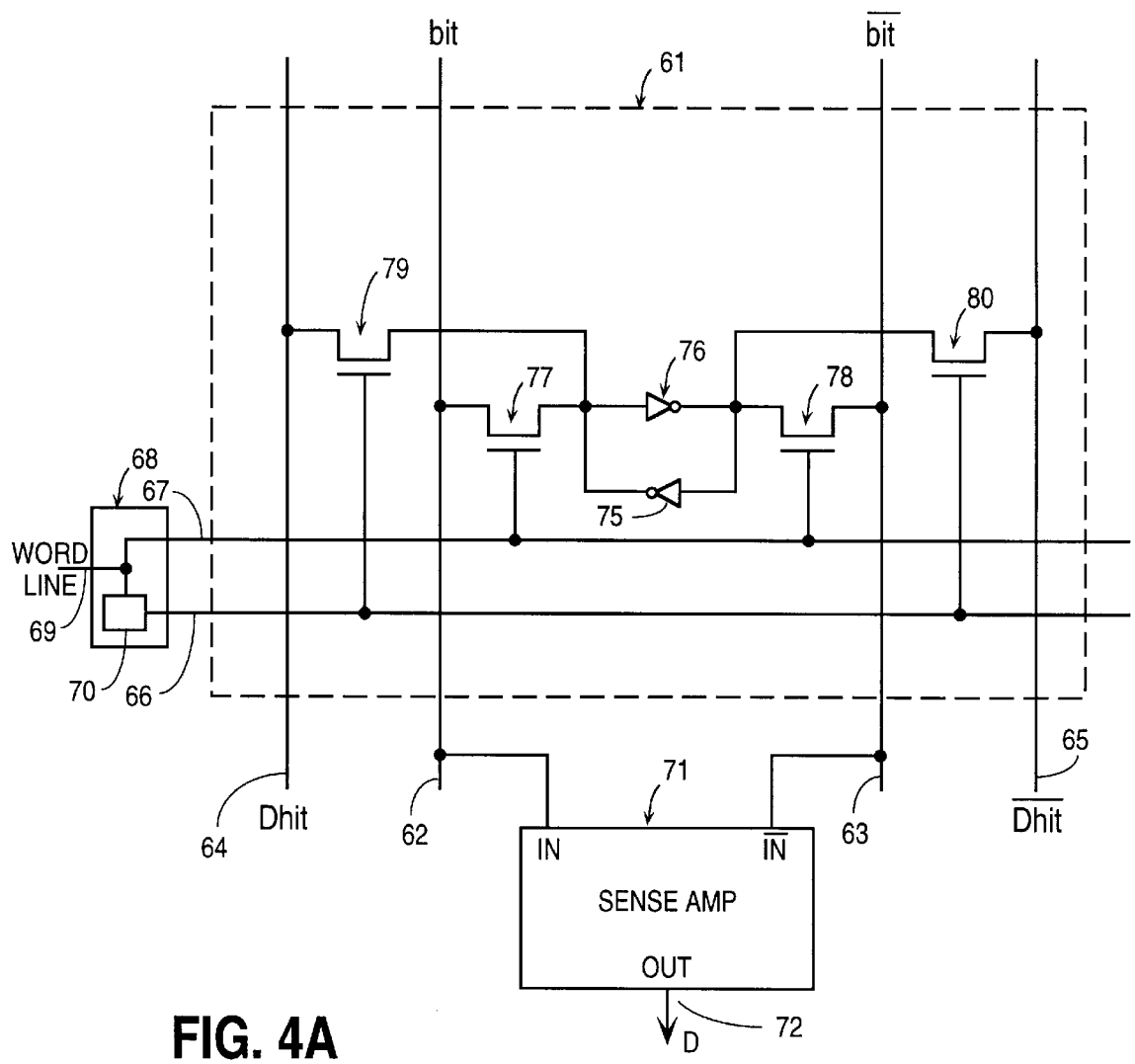
FIG. 4A shows an example of a dirty bit memory cell according to the present invention.

FIG. 4A shows an example of a dirty bit memory cell 61 according to the present invention. The dirty bit memory cell 61 includes two word lines 66 and 67 and includes a first complementary pair of data line electrodes labeled 62 and 63 and a second complementary pair of data line electrodes labeled 64 and 65. It will be appreciated that word line 67 in conjunction with data line electrodes 62 and 63 form a first port of the dirty bit memory cell 61, and the word line 66 and the data line electrodes 64 and 65 form a second port for this memory cell 61. A sense amplifier 71 is coupled to receive two inputs from the complementary pair of data lines 62 and 63. The sense amplifier 71 provides an output 72 which indicates whether the dirty bit is set or not. The bistable static memory circuit is formed by the cross coupled inverters 75 and 76. Pass gates 77 and 78 are activated by placing a high voltage level on the gates through the word line 67 in order to allow the data bit to be read out onto the data lines 62 and 63. The writing of the data bit as described below occurs through the data lines 64 and 65 which are coupled to the memory cell through the pass gates 79 and 80. These pass gates are activated by driving the word line 66 high in order to then be able to write data into the bistable memory cell formed by the inverters 75 and 76. It will be appreciated that other memory circuit configurations may be employed rather than the configuration shown in FIG. 4A. For example, a memory cell which does not require complementary data lines may be used provided that the memory cell has a first and a second port.

Figure 6:
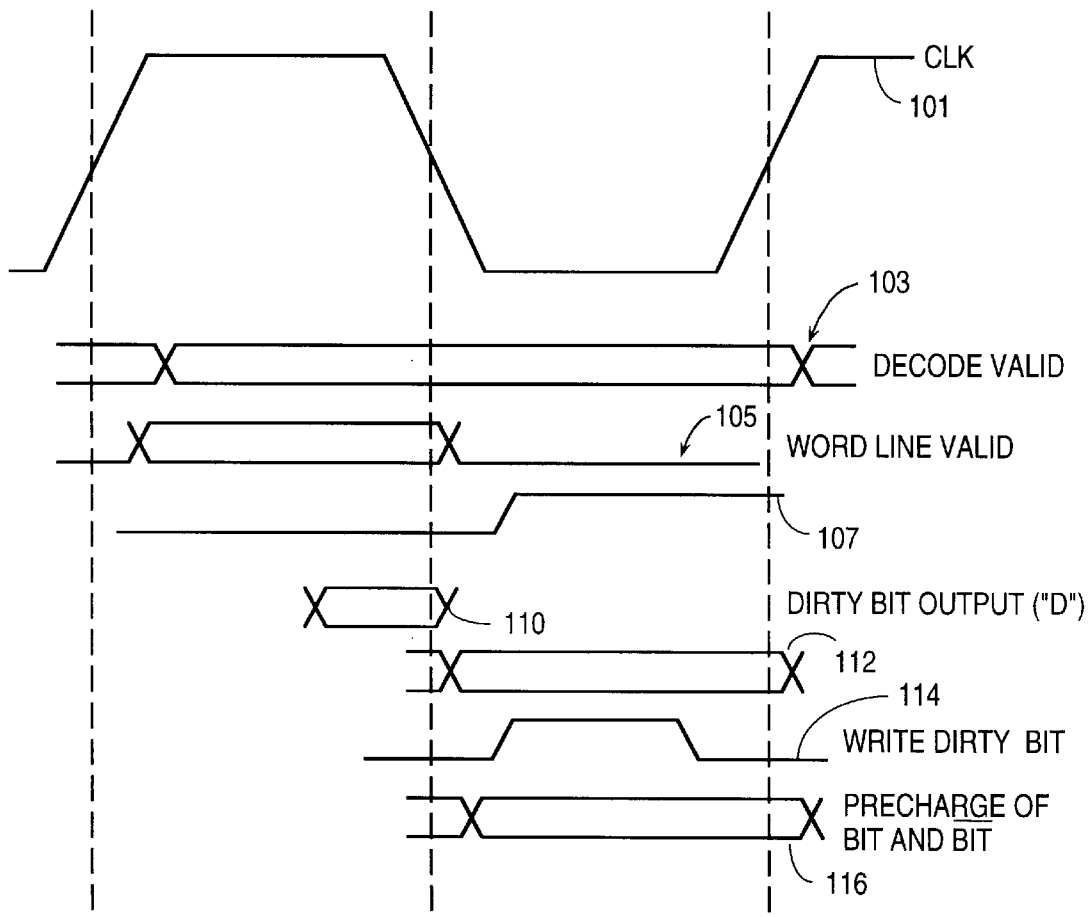
FIG. 6 shows a timing diagram showing various signal waveforms which may be employed in embodiments of the present invention.

Word lines 66 and 67 receive their signals through word line logic control circuit 68 which includes a latch 70 which is configured to provide the word line signal on word line 66 delayed by one-half clock cycle as shown by waveforms 105 and 112 of FIG. 6. Latch 70 may be a latch which is clocked on a falling edge of the clock signal such that the word line 67 is high during a first phase of the clock signal and low during the next and the word line 66 is low during that first clock phase and high during the next as shown in FIG. 6. A 1-to-2 demultiplexer may be used as an alternative control circuit 68 for providing the signals over the two word lines 66 and 67. The input to the demultiplexer (DMUX) is the word line 69 signal and the two outputs from the DMUX are respectively coupled to the word lines 66 and 67. The output to the word line 66 is shown by waveform 112 of FIG. 6. The select line of the DMUX is controlled by the clk (clock) signal, such as signal 101.

Figure 4B:
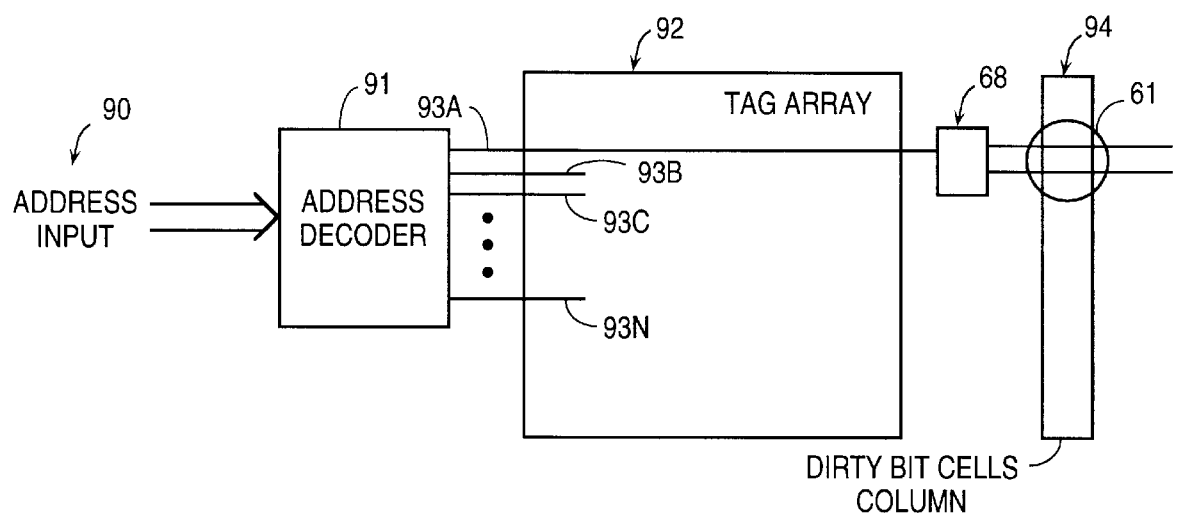
FIG. 4B shows an example of a writeback cache according to the present invention.

FIG. 4B shows an example of the architecture of a writeback cache according to the present invention. The writeback cache includes the tag array 92 which receive word line inputs 93a–93n from the address decoder 91 which is coupled to receive address inputs 90. Each word line is bussed across an entire row of a cache line as is known in the art. However, rather than bussing both word lines required in the column of dirty bit cells 94, only one word line is bussed across the tag cache array 92. Each word line typically would include control circuit 68 as shown in FIG. 4A to provide two word lines per row of dirty bit cells in the dirty bit column 94.

Figure 5:
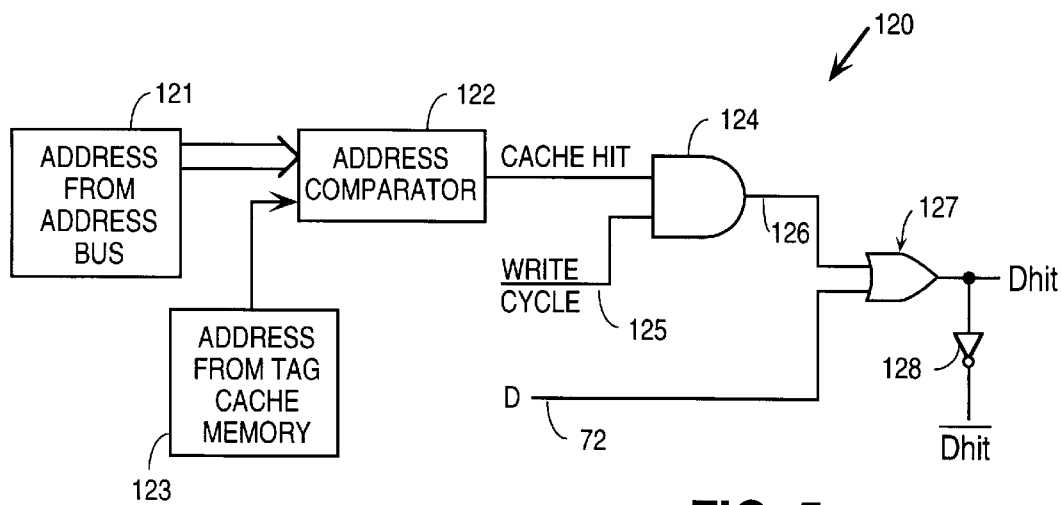
FIG. 5 shows an example of a logic circuit for providing certain signals which may be used with the present invention.

FIG. 5 shows an example of logic for generating the dirty hit data which is used to write the dirty bit data into the appropriate dirty bit memory cell. Address from an address bus is an input 121 to the address comparator 122. The other input to this address comparator 122 is an address from the tag cache memory 123. The address comparator 122 determines if there is a cache hit for the current address on the address bus indicating that the cache contains the data which is desired to be updated. This is referred to as a cache hit as is known in the art. The address comparator 122 indicates that a cache hit occurs by sending a cache hit signal to the AND gate 124. The AND gate 124 also receives a write cycle input 125 which indicates that a write operation to the cache is occurring. The output 126 indicates that a write cache hit has occurred. The output from the AND gate 124 is provided as an input to the OR gate 127, and this OR gate 127 also receives an input of the current dirty bit state from the output 72 of the sense amp which provides the status of the dirty bit in the particular row identified by the address which has been hit. The output from the OR gate 127 provides the signals for writing to the complementary data lines 64 and 65 in the column of dirty bit memory cells. Thus, the dirty bit is modified only, in the preferred embodiment, during the write cycle which occurs in writing operations.

The operation in a typical embodiment of the dirty bit memory cell of the present invention will now be described by referring to FIGS. 4A and 6. In the first phase of the clock signal 101, the value stored in the dirty bit memory cell 61 for an addressed row (cache line) is read through the first port, and in particular through the complementary data lines 62 and 63. This results in an output 72 from the sense amplifier 71 which indicates the state of the value stored in the dirty bit memory cell 61 for an addressed row (cache line). It is also determined during the first phase of the clock signal 101 if the desired information which is being written into memory is present in the cache or not. That is, it is determined in this first phase of the clock signal whether there is a cache hit because the data coming from an external source has an address which matches the address of data stored in the cache data array. If there is a cache hit, and the dirty bit is not set to indicate that the data array for this cache line contains updated information (i.e. the data is not "dirty") then the dirty bit is changed to indicate that the data is dirty through the second port of the memory cell 61 during the second phase of the clock signal 101. This can be seen through several of the waveforms shown in FIG. 6. Waveform 103 shows that the address decode operation is occurring during the two phases of the clock signal 101 shown in FIG. 6. The waveform 105 shows that the word line is validly high during the first phase of the clock signal 101. In other words, during this first phase of the clock signal 101, the word line 69 will be high causing the word line 67 to be high thereby causing the data to be read out from the inverters 75 and 76 to the data lines 62 and 63 during this first phase. This is also shown by waveform 110 which indicates the output from the dirty bit memory cell 61 during the ending portion of the first phase of the clock signal 101. The waveform 112 shows the output from the latch circuit 70 which drives the word line 66. In particular, if the word line 67 was high during the first phase of the clock signal 101 (and word line 66 was low) then the word line 66 will become high during the second phase of the clock signal 101 as shown by the waveform 112. When the word line 66 becomes high and the output from the OR gate 127 is set so that the dirty bit will be flipped to indicate a dirty state, then the data from the OR gate 127 will be driven to the data lines 64 and 65 in order to change the state of the particular dirty bit memory cell 61. Waveform 114 shows the writing into the dirty bit memory cell 61 by the data lines 64 and 65 during the second phase of the clock signal 101. Waveform 107 shows the value stored in the dirty bit memory cell 61 after the dirty bit has been changed by the writing operation through the data lines 64 and 65.

It will be appreciated that the logic circuitry of FIG. 5 causes the changing of the state stored in the dirty bit memory cell only when there is a cache hit otherwise the value stored in the dirty bit memory cell is written back into that cell. The precharging of the data lines 62 and 63 may occur if required in a particular embodiment during the second phase of the clock signal 101 as indicated by the waveform 116. This is possible due to the fact that the pass gates 77 and 78 are off, allowing precharging of the data lines 62 and 63 prior to the next phase of the clock signal 101.

Figure 7:
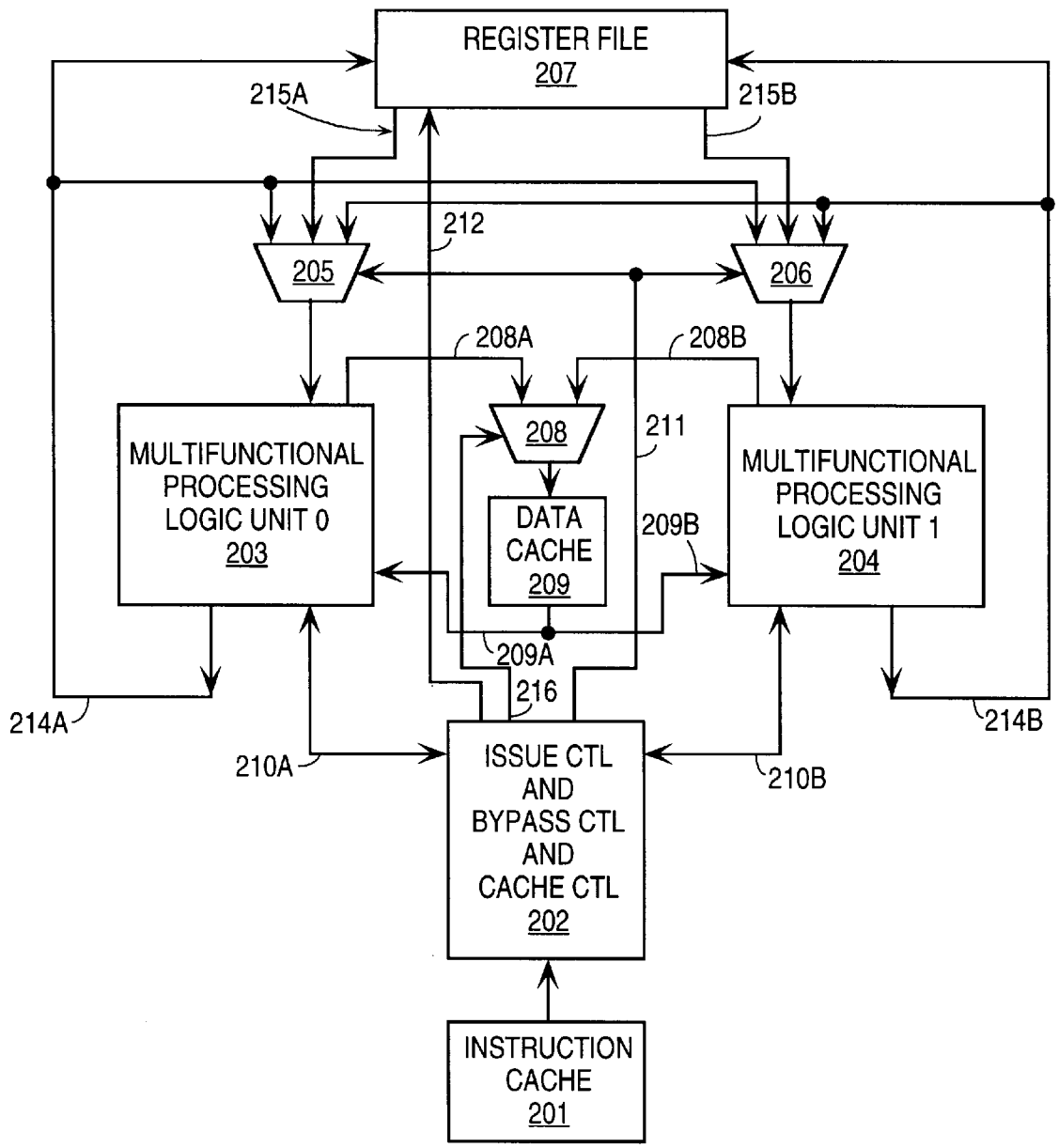
FIG. 7 shows an example of portions of a microprocessor which may employ the writeback cache of the present invention.

FIG. 7 shows an example of a microprocessor which may employ cache memories, in which cache memories may employ the writeback cache of the present invention. Further details with respect to this particular architecture of a microprocessor may be obtained through copending U.S. Patent Application titled "Method And Apparatus For Dual Issue Of Program Instructions To Symmetric Multifunctional Execution Units", assigned to the same assignee by inventors Jack Choquette and Norman K. Yeung, which application was filed on Jun. 27, 1997. It will be appreciated that the present invention may be employed for writeback caches which are on the same integrated circuit with the microprocessor or it may be employed on separate integrated circuits which form caches, such as conventional SRAM integrated circuits which are sometimes referred to as level 2 caches.

The present invention has been described with reference to various examples provided herein. It will be appreciated that numerous modifications may be made without departing from the spirit and scope of the present invention which is defined by the following claims.

What is claimed is:

1. A method for operating a memory cell in a writeback cache, said method comprising:

reading said memory cell through a first port to determine whether said memory cell stores a first value which indicates that a memory location in said writeback cache has updated data relative to data stored in another memory;

writing said first value to said memory cell through a second port if said reading determined that said memory cell did not store said first value wherein said reading occurs through said first port during a first phase of a clock signal and said writing occurs through said second port during a second phase of said clock signal, and wherein said first phase and said second phase form one clock cycle of said clock signal.

2. A method as in claim 1 further comprising determining whether an address of said memory location matches an address provided for a writing operation to store data.

3. A method as in claim 2 wherein said reading and said determining occur substantially contemporaneously.

4. A method as in claim 1 wherein said method occurs during a writing operation to said writeback cache and wherein said method further comprises determining whether a cache hit exists during said reading.

5. A method as in claim 1 wherein said first port comprises a first word line electrode and a first data line electrode and said second port comprises a second word line electrode and a second data line electrode and wherein said reading comprises activating a first signal on said first word line electrode and sensing a first output signal on said first data line electrode and said writing comprises activating a second signal on said second word line electrode and applying a signal representative of said first value to said second data line electrode.

6. A method as in claim 5 wherein said writeback cache comprises a first array of data memory cells, and a second array of tag memory cells and wherein said second word line electrode is not present in said first array.

7. A method as in claim 5 further comprising determining whether a cache hit exists by determining whether an address of said memory location matches an address provided for a writing operation to store data and wherein said writing occurs if there is a cache hit and if said first value was not stored in said memory cell as determined in said reading.

8. A method as in claim 7 further comprising precharging said first data line electrode during said writing.

9. A writeback cache having at least one dirty bit cache cell, said writeback cache comprising:
   a memory cell storing a first value which indicates that a memory location in said writeback cache has updated data relative to data stored in another memory when the data stored in said another memory is invalid;
   a first port coupled to said memory cell, said first port being used to read said memory cell to determine if said memory cell is storing said first value;
   a second port coupled to said memory cell, said second port being used to write said first value to said memory cell;
   wherein said first port comprises a first word line electrode and a first data line electrode, and said second port comprises a second word line electrode and a second data line electrode.

10. A writeback cache as in claim 9 wherein said first word line electrode and said second word line electrode are coupled through a logic circuit.

11. A writeback cache as in claim 9 wherein said first value is stored in said memory cell when an address comparator indicates there is a cache hit and when said first value is not stored in said memory cell as indicated by a reading operation performed through said first port.

12. A writeback cache as in claim 9 further comprising:
   a data cache array comprising a first plurality of rows of data memory cells, each of said rows having a first plurality of columns;
   a tag cache array comprising a second plurality of rows of tag memory cells, each of said rows having a second plurality of columns;
   an address comparator coupled to said tag cache array and to said second port.

13. A writeback cache as in claim 12 wherein said second word line electrode is not present in said data cache array and wherein said second word line and said first word line are coupled through a logic circuit.

14. A writeback cache as in claim 12 wherein said writeback cache is formed on a single semiconductor substrate which constitutes an integrated circuit.

15. A writeback cache as in claim 14 wherein said integrated circuit comprises a microprocessor.

16. A digital processing system comprising:
   a bus;
   a first memory coupled to said bus;
   a writeback cache coupled to said bus, said writeback cache comprising:
      a plurality of rows of data cache cells coupled to said bus;
      a plurality of dirty bit memory cells each storing a first value which indicates that a memory location in a corresponding row of data cache cells has updated data relative to data stored in said first memory when the data stored in said first memory is invalid;
      a plurality of first ports each coupled to a corresponding one of said dirty bit memory cells, each first port being used to read said corresponding one of said dirty bit memory cells to determine if said corresponding one of said dirty bit memory cells is storing said first value; and
      a plurality of second ports each coupled to said corresponding one of said dirty bit memory cells and being used to write said first value to said corresponding one of said dirty bit memory cells.

17. A digital processing system as in claim 16 further comprising a microprocessor coupled to said bus and to said writeback cache.

18. A digital processing system as in claim 17 wherein said microprocessor and said writeback cache are disposed together on a single semiconductor substrate and wherein said first memory comprises DRAM.

* * * * *